(12) United States Patent
Lee

(10) Patent No.: US 8,247,025 B2
(45) Date of Patent: Aug. 21, 2012

(54) MAGNETIC NANOPARTICLE FABRICATION

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 317 days.

(21) Appl. No.: 12/468,329

(22) Filed: May 19, 2009

(65) Prior Publication Data

US 2010/0297431 A1    Nov. 25, 2010

(51) Int. Cl.
*B32B 5/16* (2006.01)
(52) U.S. Cl. .......................................... 427/130
(58) Field of Classification Search ................... 427/550, 427/457, 474, 502, 547, 548, 598, 599, 127, 427/128, 19
See application file for complete search history.

(56) References Cited

U.S. PATENT DOCUMENTS

| | | | |
|---|---|---|---|
| 2005/0196606 A1 | 9/2005 | Ihara et al. | |
| 2006/0099462 A1 | 5/2006 | Ahner et al. | |
| 2008/0108271 A1* | 5/2008 | Kang et al. | 445/51 |

OTHER PUBLICATIONS

Jin-Seung Jung, et al "Synthesis and magnetic characterization of ZnFe2O4 nanostructure in AAO template" IEEE Transactions on Magnetics, vol. 41 Issue:10; Oct. 2005; pp. 3403-3405.

Jung, J.-S., et al "CoFe2O4 nanostructures with high coercivity" Journal of Applied Physics, vol. 97 Issue:10; May 2005 pp. 10F306-10F306-3.

A.S. Vyacheslavov, et al "Ordered cobalt nanowires in mesoporous aluminosilicate" Materials Science and Engineering: C, vol. 27, Issues 5-8, Sep. 2007, pp. 1411-1414.

Australian Patent Office; International Search Report and Written Opinion in related PCT application (PCT/KR2010/003140) to which priority is claimed by the present application; Aug. 12, 2010.

Shavel, et al. "Synthesis and Characterization of Iron/Iron Oxide Core/Shell Nanocubes," Advanced Functional Materials. pp. 1-7, 2007.

Chitu, L. et al., "Effect of Magnetic Field on Self-Assembling of Colloidal Co Magnetic Nanoparticles," Applied Surface Science, 2006, pp. 5559-5562, vol. 252, Issue 1.

Niu, Helin et al., "Synthesis and One-Dimensional Self-Assembly of Acicular Ni Nanocrystallites Under Magnetic Fields," Journal of Physical Chemistry, B, 2004, pp. 3996-3999, vol. 108.

Luo, Hongmei et al., "Magnetic Cobalt Nanowire Thin Films," Journal of Physical Chemistry, 2005, pp. 1919-1922, vol. 109.

Albrecht, T. et al., "Ultrahigh-Density Nanowire Arrays Grown in Self-Assembled Diblock Copolymer Templates," Science, 2000, pp. 2126-2129, vol. 290, No. 5499.

Athanassiou, E. K., et al., "Template Free, Large Scale Synthesis of Cobalt Nanowires Using Magnetic Fields for Alignment," 2007, Nanotechnology, vol. 18, Issue 16.

* cited by examiner

*Primary Examiner* — Michael Cleveland
*Assistant Examiner* — Tabassom Tadayyon Eslami
(74) *Attorney, Agent, or Firm* — Workman Nydegger

(57) ABSTRACT

Techniques for fabricating magnetic nanoparticles are provided. In one embodiment, a method performed under the control of at least one apparatus for fabricating magnetic nanoparticles includes preparing a substrate that defines at least one cavity through a portion thereof, soaking the substrate with a solution, the solution including a multiple number of magnetic nanoparticles, and applying a magnetic field so as to collect at least a portion of the magnetic nanoparticles into the at least one cavity.

27 Claims, 17 Drawing Sheets

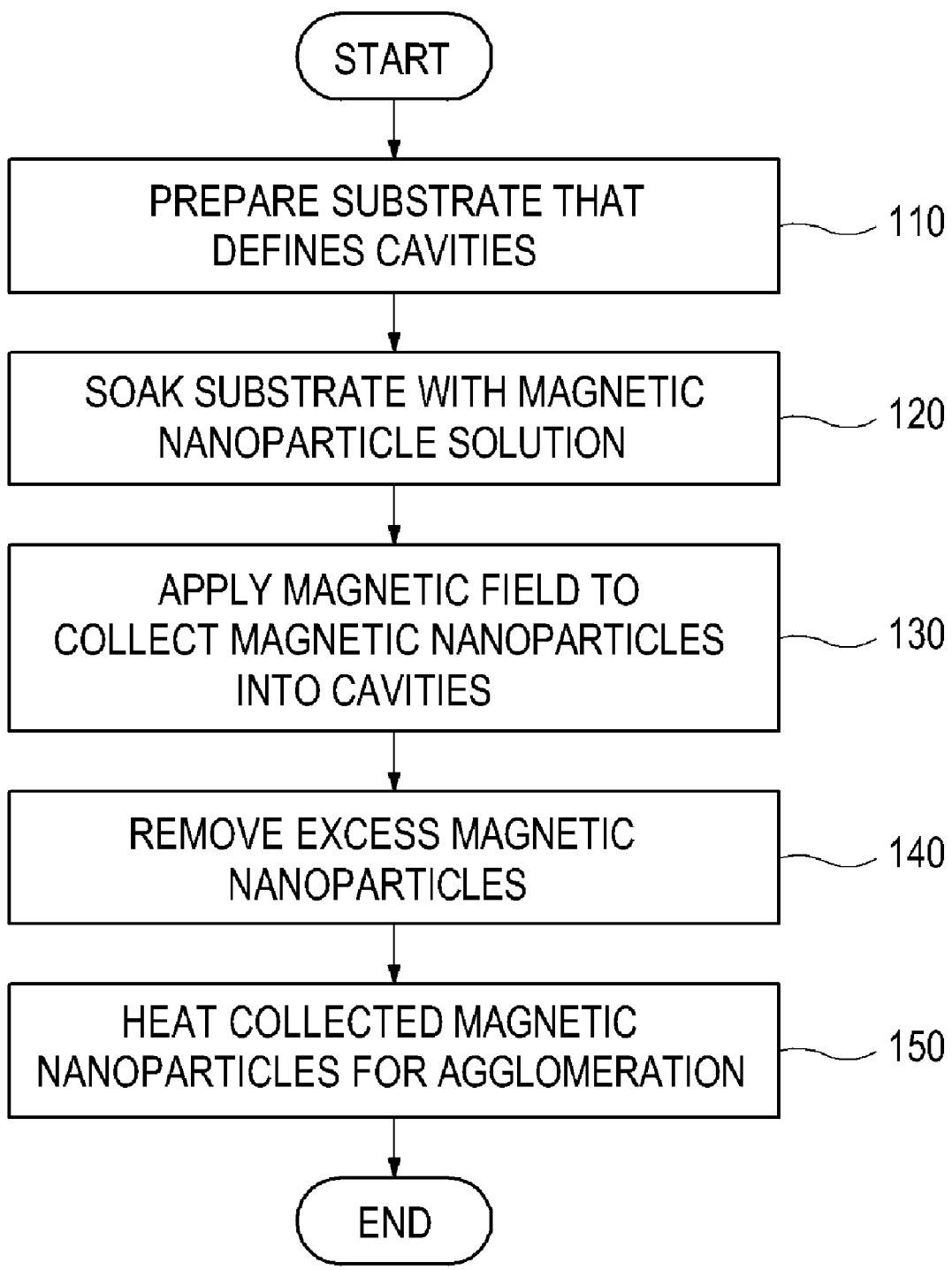

MAGNETIC NANOPARTICLE FABRICATION

BACKGROUND

Nanotechnology refers to a field involving manipulation and manufacture of materials and devices on the scale of nanometers (i.e., billionths of a meter). Structures the size of 100 nm or smaller (i.e., nanostructures) have garnered attention due to their potential in creating many new devices with wide-ranging applications, including optic, electronic, and magnetic applications. It has been envisioned that nanostructures may be used in manufacturing smaller, lighter, and/or stronger devices with unprecedented levels of information processing and/or storage. However, to successfully realize such devices, significant challenges must be overcome. New and improved tools are needed to control the properties and structure of materials at the nanoscale. Further, new and improved tools are needed for assembling such materials into nanostructures and for the further assembly of such nanostructures into more-complex devices.

SUMMARY

Techniques for fabricating magnetic nanoparticles, apparatuses for fabricating magnetic nanoparticles, and magnetic nanoparticle fabricated structures are provided. In one embodiment, a method performed under the control of at least one apparatus for fabricating magnetic nanoparticles includes preparing a substrate that defines at least one cavity through a portion thereof, soaking the substrate with a solution, the solution including a plurality of magnetic nanoparticles, and applying a magnetic field so as to collect at least a portion of the magnetic nanoparticles into the at least one cavity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 is an example flow diagram of a method for fabricating magnetic nanoparticle aggregates in accordance with an illustrative embodiment.

DETAILED DESCRIPTION

Figure 2A:
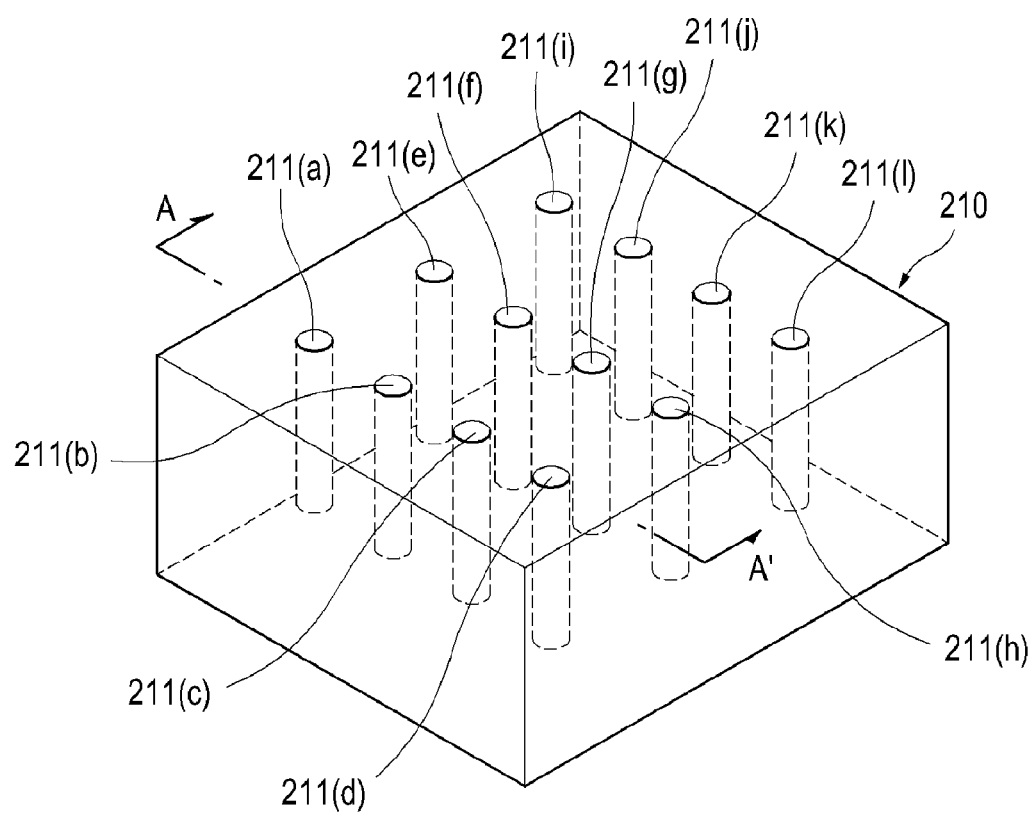
FIG. 2A shows a perspective view of an illustrative embodiment of a substrate having cavities.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Small-scale structures, such as nanostructures, which may be suitable for creating many new devices with wide-ranging applications, are difficult to fabricate due to their small size. Effective individual manipulation of molecules or clusters thereof (i.e., nanoparticles) may be employed in fabricating such nanostructures. Techniques described in the present disclosure may employ magnetic fields to collect and form aggregates of magnetic nanoparticles at desired locations of a substrate. Such magnetic nanoparticle aggregates may be further processed to attain a desired structure. In some embodiments, the magnetic nanoparticle aggregates may be further processed to form magnetic nanostructures (e.g., magnetic storage structures) made of the same or similar substances as that of the magnetic nanoparticles at the substrate. In other embodiments, the magnetic nanoparticle aggregates may be used as seeds or catalysts for forming nanostructures made of substances different from that of the magnetic nanoparticles (e.g. semiconductor nanorods) at the substrate.

Figure 2B:
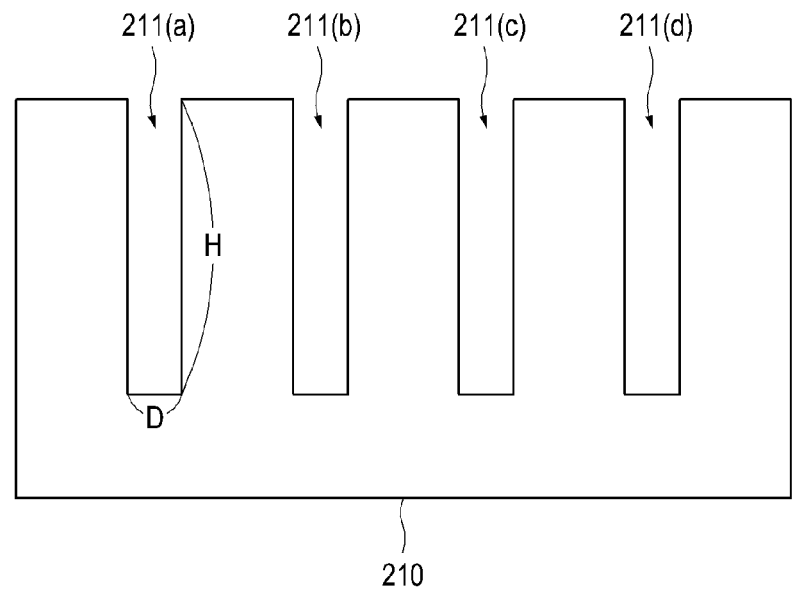
FIG. 2B is a cross-sectional view of an illustrative embodiment of the substrate of FIG. 2A taken along line A-A'.

FIG. 1 is a flow diagram of a method for fabricating magnetic nanoparticle aggregates in accordance with an illustrative embodiment. FIGS. 2A-2F are a series of diagrams illustrating the method illustrated in FIG. 1 and the structures fabricated according to the method. Referring to FIG. 1, in block 110, a substrate that defines at least one cavity through at least a portion of substrate is prepared. FIG. 2A illustrates a perspective view of a suitable substrate 210 that defines at least one cavity, and FIG. 2B illustrates a cross-sectional view of substrate 210 of FIG. 2A taken along lines A-A'. As illustrated, substrate 210 is shown having non-interconnected cavities 211(a)-211(l) (hereinafter referred to as "cavities 211"). Cavities 211 are each substantially isolated from each other and do not have any aperture(s) or opening(s) that allow material to move therethrough. In FIGS. 2A and 2B, each of cavities 211 is illustrated as having a cylindrical shape, substantially isolated from one another. In one embodiment, a depth H of cavities 211 may be in the range from about 0.1 nm to about 999 nm, from about 1 nm to about 500 nm, or from about 5 nm to about 100 nm. In one embodiment, the diameter D of cavities 211 may be in the range from about 0.1 nm to about 999 nm, from about 1 nm to about 20 nm, or from about 1 nm to about 10 nm. For example, where substrate 210 is used to fabricate a magnetic storage device, depth H and the diameter of cavities 211 may respectively be in the range from about 5 nm to about 100 nm and about 1 nm to about 20 nm. In one embodiment, substrate 210 may be made of materials that are resistant to heat (e.g., temperature ranging from about 200° C. to about 1000° C.). For example, substrate 210 may be made from silicon (Si) or other semiconductor materials. Further, in some embodiments, substrate 210 may be coated with at least one material that would protect the surface of substrate 210 from oxidation and other damage. Examples of such materials include, but are not limited to, silicon oxide and graphene.

In one embodiment, by way of a non-limiting example, substrate 210 may be prepared by an imprint lithography method, a block copolymer lithography method, an anodic aluminum oxide (AAO) mask lithography method (which uses an AAO membrane as an etching mask), or any one of a variety of other appropriate lithography techniques. It should be appreciated that the shapes and dimensions of substrate 210 and cavities 211 described in conjunction with FIGS. 2A and 2B, and the techniques used in fabricating substrate 210 are illustrative examples of some of the various ways in which substrate 210 may be prepared.

Figure 2C:
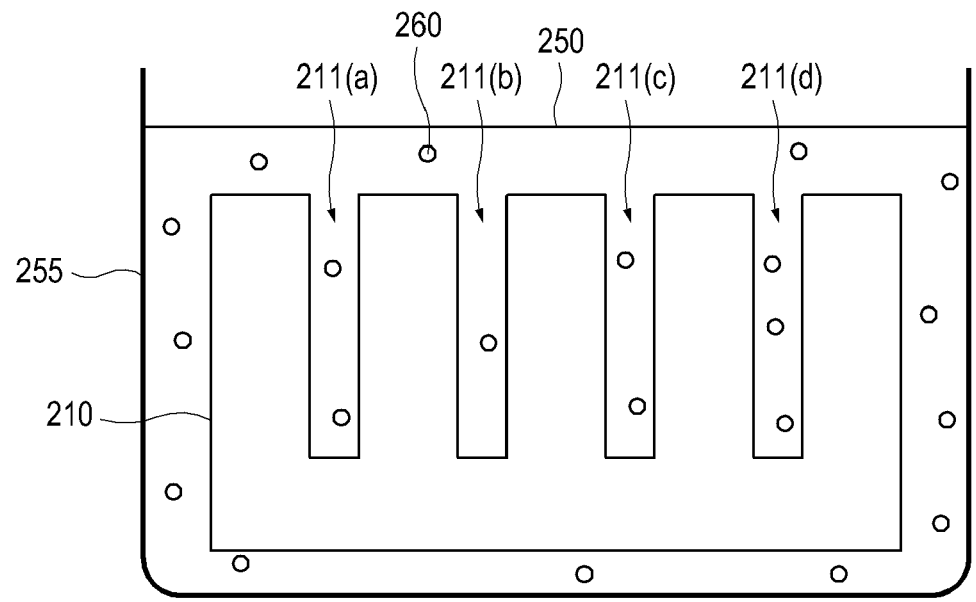
FIG. 2C is a cross-sectional view of the substrate of FIG. 2A soaked in a magnetic nanoparticle solution.

Referring again to FIG. 1, in block 120, the prepared substrate is soaked with a magnetic nanoparticle solution that contains magnetic nanoparticles. FIG. 2C illustrates a cross-sectional view of substrate 210 soaked in a magnetic nanoparticle solution 250 that contains magnetic nanoparticles 260. In one embodiment, substrate 210 may be soaked by immersing substrate 210 into magnetic nanoparticle solution 250 retained by a container 255. For example, as shown in FIG. 2C, substrate 210 may be immersed in a face-up position into container 255 (i.e., positioned such that the surface defining the openings of cavities 211 is substantially opposite to container 255). In other examples, substrate 210 may be immersed into container 255 in a face-down position (i.e., positioned such that the surface defining the openings of cavities 211 is substantially facing container 255).

As used herein, the term "magnetic nanoparticle" generally refers to a solid particle formed having a size in the nanometer range that may be manipulated under the influence of a magnetic field. In one embodiment, magnetic nanoparticles 260 may include any magnetically responsive substance. Examples of such substances include, but are not limited to, (a) metals, alloys, or composites containing transition metal elements (e.g., Fe, Co, Ni) or rare-earth elements (e.g. lanthanides), and (b) chalcogenides (e.g., oxides, sulfides, slenicdes), pnictides (e.g., nitrides, pohophides, arsenides), borides, carbides, or silicides of the transition metal elements or rare-earth elements.

FIGS. 3A-3D are conceptual views of illustrative embodiments of magnetic nanoparticles. Referring to FIGS. 3A-3D, the magnetic nanoparticles may be of an identical substance (e.g., Fe magnetic nanoparticle 310 in FIG. 3A), or two or more different substances (e.g., Fe$_2$SO$_3$ and Pt, and α-Fe and FePd in FIGS. 3B-3D). For ease of explanation, the magnetic nanoparticles including identical substances (e.g., Fe) will be referred to as "single substance magnetic nanoparticles," whereas, the magnetic nanoparticles including two or more different substances will be referred to as "multiple substance magnetic nanoparticles." The multiple substance magnetic nanoparticles may be further classified into different categories based on various criteria. Examples of such categories include, but are not limited to, "subcluster segregated magnetic nanoparticles" (e.g., a magnetic nanoparticle 320 with a Fe$_2$O$_3$ subcluster 321 and a Pt subcluster 322 in FIG. 3B), "core-shell segregated magnetic nanoparticles" (e.g., a magnetic nanoparticle 330 with a Pt core 331 and a Fe$_2$O$_3$ shell 322 in FIG. 3C) and "mixed magnetic nanoparticles" (e.g., a magnetic nanoparticle 340 with a FePd phase 341 and a α-Fe phase 342 in FIG. 3D).

As used herein, the subcluster segregated magnetic nanoparticles refers to magnetic nanoparticles including multiple subclusters where each subcluster is made of an identical substance. Further, the core-shell segregated magnetic nanoparticles refer to magnetic nanoparticles including a core and a shell coated thereon, where the core and the shell are made of an identical substance. For ease of explanation, hereinafter, a core-shell segregated magnetic nanoparticle with a core of substance A and a shell of substance B will be expressed as A@B nanoparticles. For example, Pt@Fe$_2$SO$_3$ nanoparticles are core-shell segregated magnetic nanoparticles with a Pt core and a Fe$_2$O$_3$ shell (see, FIG. 3C). Also, the mixed magnetic nanoparticles refer to magnetic nanoparticles including multiple intermixed substances. The multiple substances may be mixed in a random or orderly manner. The above magnetic nanoparticles may be prepared in accordance with any one of a variety of appropriate methods, which include, but are not limited to, molecular beams, precipitation, co-precipitation, thermal decomposition, microemulsion, and hydrothermal synthesis.

In one embodiment, the magnetic nanoparticle solution may be prepared by dispersing the magnetic nanoparticles in a solvent. The solvent may be water (e.g., deionized water). However, other solvents, including organic solvents (e.g., alkane, hexane) may also be used. The dispersion can be performed with the aid of surfactant(s) or ligand(s). An example of such an applicable surfactant includes, but is not limited to, 1-octadecylamine. Further, in some embodiments, ultrasonic agitation or other appropriate mixing processes may be carried out to facilitate the dispersion of the magnetic nanoparticles throughout the solvent. For example, dispersing about 10 mg of magnetic nanoparticles with the diameter of about 10 nm in about 10 ml of organic solvent under standard temperature and pressure (STP) produces a near-saturated magnetic nanoparticle solution. For ease of explanation, the concentration of magnetic nanoparticles in a magnetic nanoparticle solution will be expressed in the unit of "sat," where 1 sat is defined as the magnetic nanoparticle concentration of the above near-saturated magnetic nanoparticle solution. In some embodiments, the magnetic nanoparticle concentration of the magnetic nanoparticle solution may be in the range from about 0.01 sat to about 1 sat, from about 0.05 sat to about 0.5 sat, or from about 0.08 sat to about 0.12 sat. In other embodiments, the magnetic nanoparticle concentration may be about 0.1 sat.

Figure 2D:
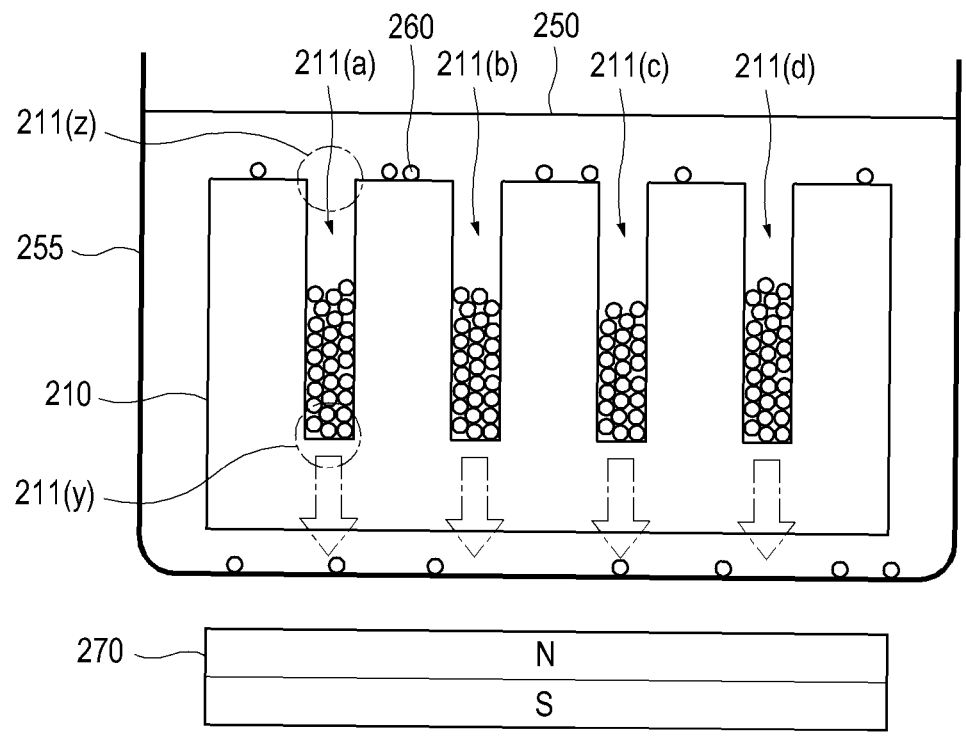
FIG. 2D is an illustrative embodiment of a magnetic-field generating unit applying a magnetic field to a magnetic nanoparticle solution.

Referring again to FIG. 1, in block 130, a magnetic field is applied to the magnetic nanoparticle solution to collect the magnetic nanoparticles. FIG. 2D illustrates a magnetic-field generating unit 270 applying a magnetic field to the magnetic nanoparticle solution 250 so as to collect at least a portion of magnetic nanoparticles 260 in magnetic nanoparticle solution 250 into cavities 211 of substrate 210. In one embodiment, magnetic-field generating unit 270 may be a permanent magnet. In another embodiment, magnetic-field generating unit 270 may be an electromagnet. Magnetic-field generating unit 270 may be positioned in a location that would enable it to effectively force magnetic nanoparticles 260 to move into target locations (e.g., cavities 211). For example, magnetic-field generating unit 270 may be positioned substantially adjacent a side opposite to the surface in which the openings of cavities 211 are formed. In the above example, where substrate 210 is immersed into container 255 in a face-up position, as shown in FIG. 2D, magnetic-field generating unit 270 may be positioned underneath container 255, closer to the bottom portion 211(y) of the cavities 211 than the top portion 211(z) thereof. Where substrate 210 is immersed into container 255 in a face-down position, magnetic-field generating unit 270 may be positioned above container 255 closer to the bottom portion 211(y) of the cavities 211 than the top portion 211(z) thereof.

The strength of the applied magnetic particles may be set to a range that would effectively collect at least some of magnetic nanoparticles 260 into cavities 211. In some embodiments, the strength of the applied magnetic field may be in the range from about 0.1 Tesla (T) to about 3 T, from about 0.1 T to about 1 T, or from about 0.3 T to about 0.8 T. In one embodiment, the magnetic field of about 0.5 T may be applied in carrying out this step (block 130 in FIG. 1). Although one magnetic-field generating unit 270 is illustrated in FIG. 2D for ease of explanation, it should be appreciated that, depending on various factors (e.g., the location, shape, and/or size of cavities 211), multiple magnetic-field generating units may be used.

The magnetic field may be applied for a prescribed period, and if necessary, may be applied multiple times. The length of the prescribed period may depend on various factors, such as the magnetic properties of the particular magnetic nanoparticles used, the magnetic nanoparticle concentration of the magnetic nanoparticle solution, the strength of the applied magnetic field, and the target amount of the magnetic nanoparticles to be collected in cavities 211, to name a few. The target amount may vary depending on the structure to be fabricated and the role the collected magnetic nanoparticles play in fabricating the above structure. For example, where magnetic structures made of magnetic materials are to be fabricated so as to completely fill cavities 211, the magnetic nanoparticles may be collected to produce an amount that would nearly fill cavities 211. On the other hand, where the collected magnetic nanoparticles are to be used as seeds or catalysts in forming structures made of non-magnetic materials, a relatively smaller amount of magnetic nanoparticles 260 may be collected into cavities 211. In some embodiments, the magnetic field may be applied multiple times by repeating the following procedures: withdrawing substrate 210 from magnetic particle solution 250, drying substrate 210 for a prescribed period of time, re-immersing substrate 210 into magnetic nanoparticle solution 250, and reapplying the magnetic field.

Figure 2E:
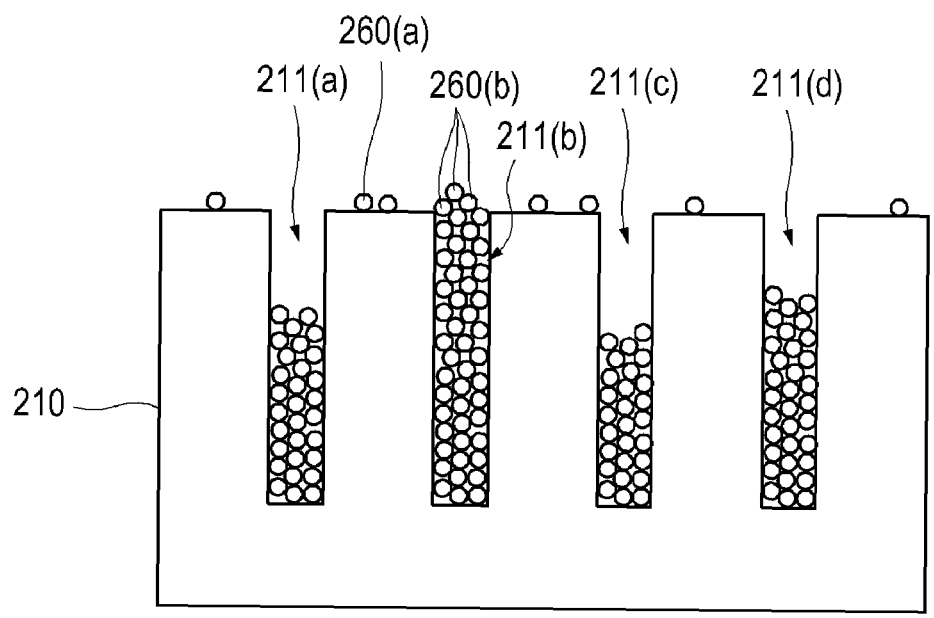
FIG. 2E is a cross-sectional view of the substrate of FIG. 2A withdrawn from a magnetic nanoparticle solution.

Referring again to FIG. 1, in block 140, excess magnetic nanoparticles collected on the substrate are removed. FIG. 2E illustrates substrate 210 withdrawn from magnetic nanoparticle solution 250 and having excess magnetic nanoparticles 260(a) on the surface(s) of substrate 210 and other excessively collected magnetic nanoparticles 260(b) prior to being removed therefrom. In one embodiment, the above excess magnetic nanoparticles may be removed by brushing off excess magnetic nanoparticles 260(a) and 260(b) using an appropriate polishing device. Where substrate 210 is immersed into container 255 in a face-down position, magnetic generating unit 270 may be continuously applied to substrate 210 while being withdrawn from container 255 so as to prevent the collected nanoparticles from falling out of cavities 211 due to gravity. Thereafter, substrate 210 may be rotated to the face-up position so that excessive magnetic nanoparticles may be removed therefrom.

Figure 2F:
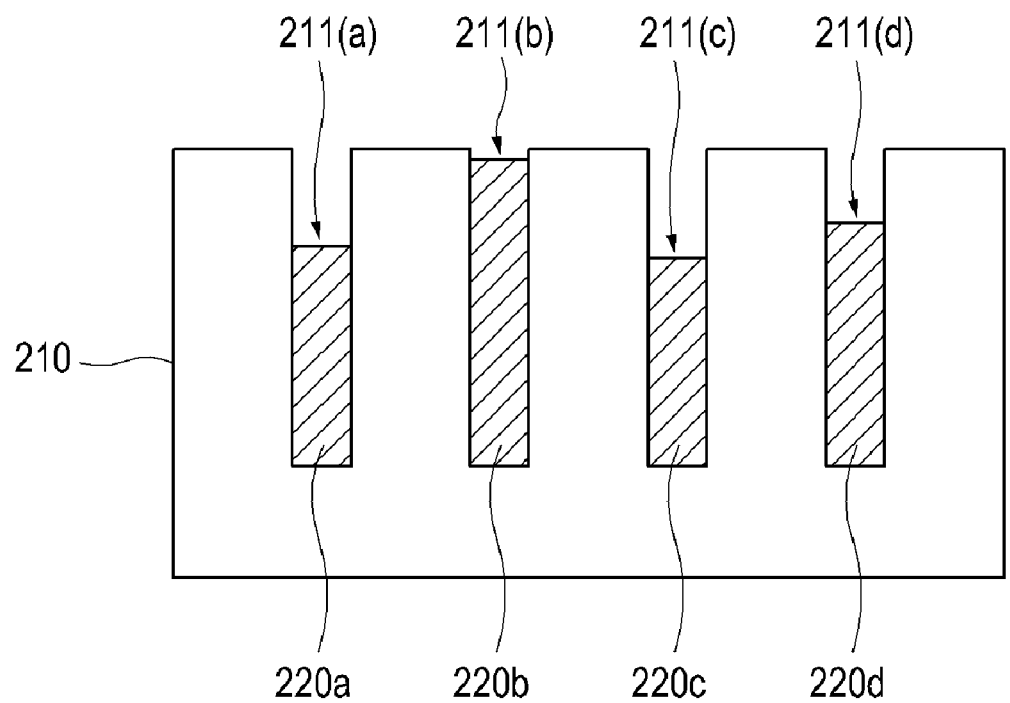
FIG. 2F is an illustrative embodiment of magnetic nanoparticle agglomerates.
Figure 3A:
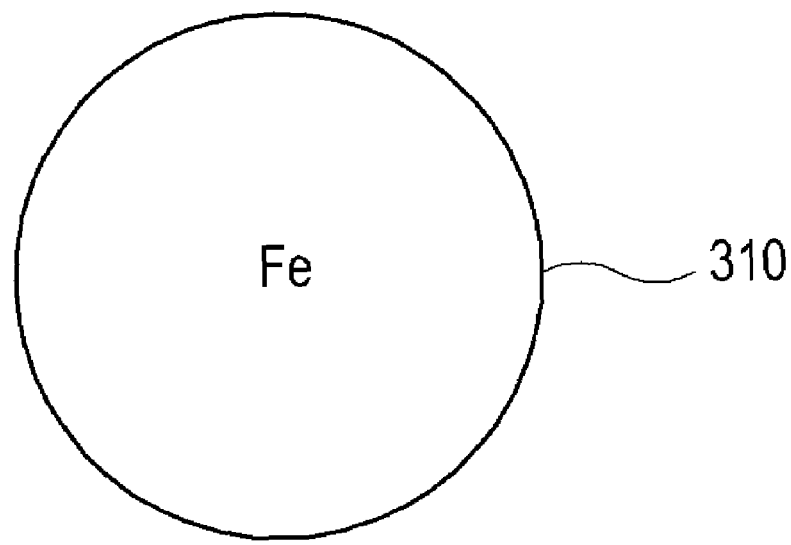
FIG. 3A is a conceptual view of an illustrative embodiment of a Fe magnetic nanoparticle.
Figure 3B:
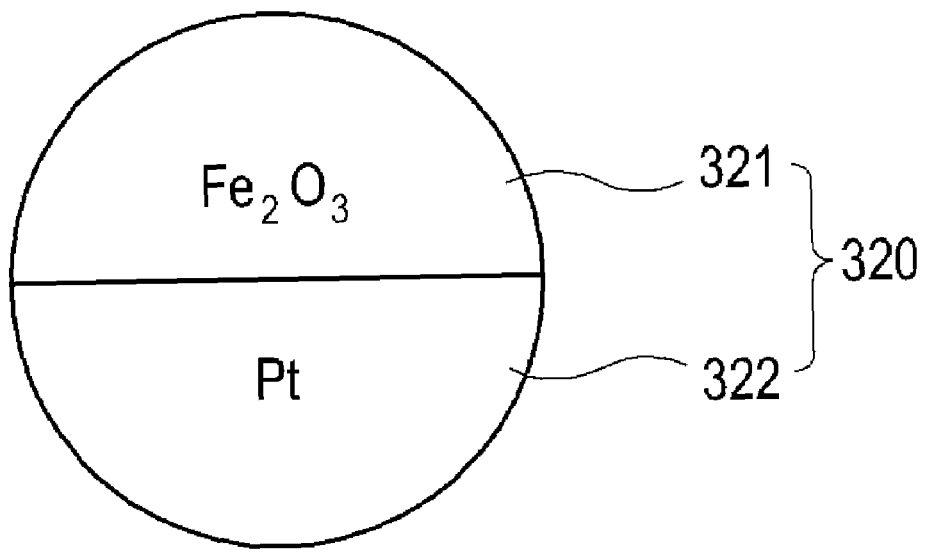
FIG. 3B is a conceptual view of an illustrative embodiment of subcluster segregated magnetic nanoparticles.
Figure 3C:
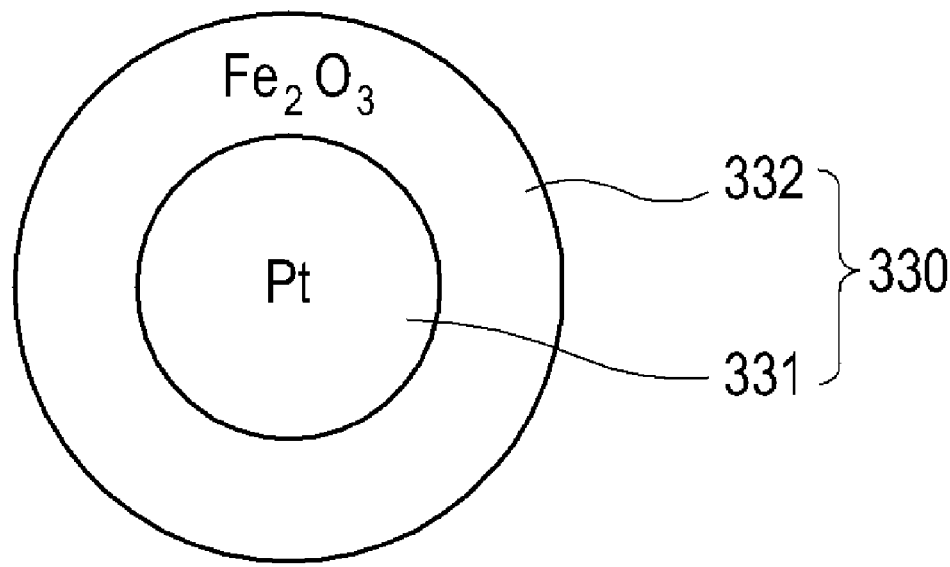
FIG. 3C is a conceptual view of an illustrative embodiment of core-shell segregated magnetic nanoparticles.
Figure 3D:
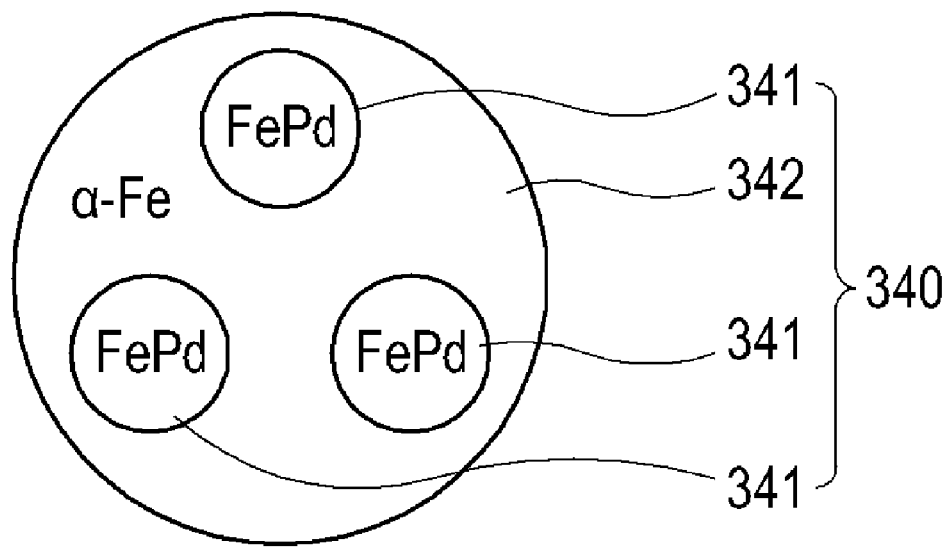
FIG. 3D is a conceptual view of an illustrative embodiment of mixed magnetic nanoparticles.

Referring again to FIG. 1, in block 150, the collected magnetic nanoparticles are agglomerated by, for example, heating the collected magnetic nanoparticles. FIG. 2F illustrates magnetic nanoparticle agglomerates 220a-220d (hereinafter, referred to as magnetic nanoparticle agglomerates 220) which are produced by heating the magnetic nanoparticles collected in cavities 211. As used herein, the terms "agglomerating" and "agglomerate" respectively refer to an act of transforming particles into a cohesive mass or a unitary body through an arbitrary process (e.g., heating process) and the cohesive mass produced by the above action. Examples of the heating process include, but are not limited to, annealing, sintering, and calcining processes.

In one embodiment, the above heating process may be performed in an oxidizing, a reducing, or an inert atmosphere. In other embodiments, the above heating process may be sequentially performed in different atmospheres (e.g., performed in an oxidizing atmosphere and then in a reducing atmosphere). Where the magnetic nanoparticles are dispersed in a solvent with the aid of surfactant(s) or ligand(s), the outer surface of the collected magnetic nanoparticles may be coated with the surfactant(s) or ligand(s). When coated as such, the above heating process may be first performed in an oxidizing atmosphere to substantially remove (e.g., burn with oxygen) the surfactant(s) or ligand(s) from the collected magnetic nanoparticles. The oxidizing atmosphere may be created by introducing oxidizing gas(es) (e.g., oxygen) and optionally inert gas(es) (e.g., nitrogen, argon, helium, carbon dioxide). Removing the surfactant(s) or ligand(s) may reduce the inter-particle spacing between the collected magnetic nanoparticles and help further agglomerating them into a more densely-packed cohesive mass.

Further, in cases where the collected nanoparticles contain oxygen atoms (e.g., Pt@$Fe_2O_3$ magnetic nanoparticles), the above heating process may be performed in a reducing atmosphere to remove the oxygen atoms from the magnetic nanoparticles and transform them into a different type of magnetic nanoparticles made of different substances. The reducing atmosphere may be created by introducing reducing gas(es) (e.g., hydrogen, carbon monoxide) and optionally inert gas (es). For example, Pt@$Fe_2O_3$ magnetic nanoparticles may be annealed at a temperature from about 550° C. to about 650° C. for about 9 hours under a vacuum with a gas flow mixture of argon gas (or other comparable inert gas known in the art) and hydrogen gas, where the hydrogen gas may include from about 5% to about 100% of the gas flow mixture. In the presence of the hydrogen gas, annealing may reduce the $Fe_2O_3$ shell into iron (Fe) and form an agglomerated FePt alloy. In some cases, the above heating process may be performed in an inert atmosphere. The inert atmosphere may be created by introducing at least one inert gas(es).

In some embodiments, the collected magnetic nanoparticles may be heated at a specified temperature so as to change the internal crystal structure of the collected nanoparticles and/or surfactants attached to the surface of the collected nanoparticles. For example, the collected FePt alloy nanoparticles with disordered face-centered-cubic (fcc) structure may be heated to a temperature of about 650° C. to convert them into FePt alloy nanoparticles with an ordered face-centered-tetragonal (fct) structure. In another example, the collected FePt alloy nanoparticles with surfactants may be heated to a temperature of about 650° C. to convert the surfactants surrounding the FePt alloy nanoparticles into a carbonaceous coating around the FePt alloy nanoparticles. The internal crystal structure of the FePt alloy nanoparticles may also be altered through the above surfactant conversion process. The temperature at which such conversion takes place may vary depending on the chemical composition of the collected magnetic nanoparticles.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4A:
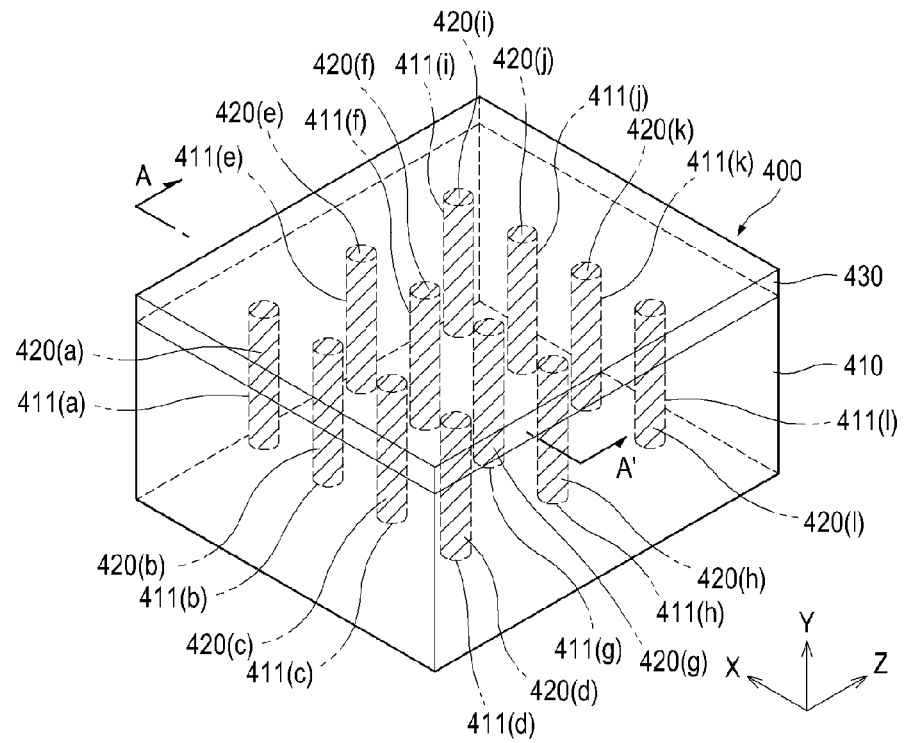
FIG. 4A is a perspective view of an illustrative embodiment of a data storage device.
Figure 4B:
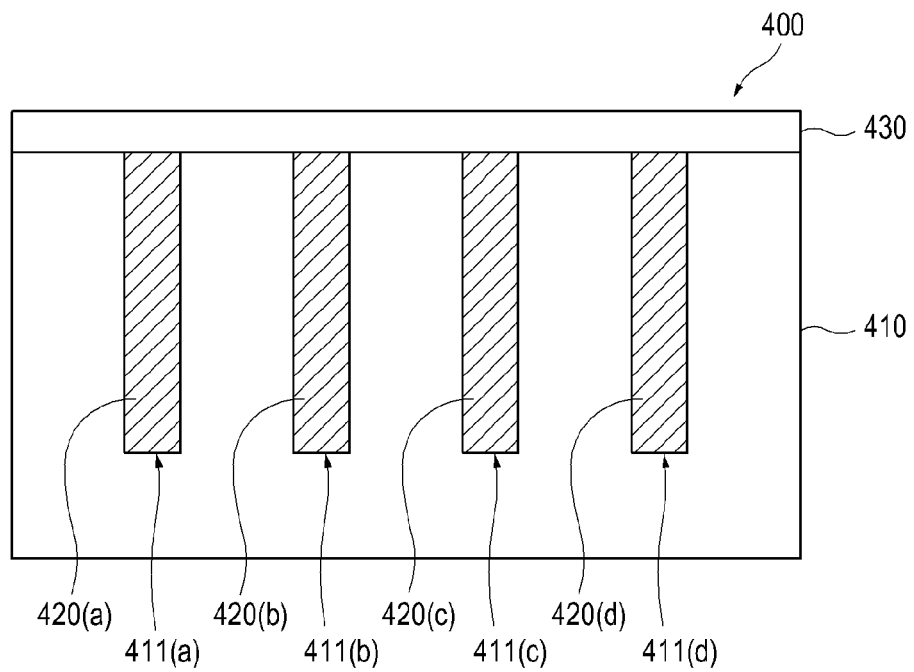
FIG. 4B is a cross-sectional view of an illustrative embodiment of the data storage device of FIG. 4A taken along line A-A'.

Magnetic nanoparticle aggregates 220 may be used in fabricating various devices and/or structures. In one embodiment, one of magnetic nanoparticle aggregates 220 may be used as a magnetic structure for storing data. FIG. 4A is a perspective view of an illustrative embodiment of a data storage device 400. FIG. 4B is a cross-sectional view of data storage device 400 of FIG. 4A taken along line A-A'. Referring to FIGS. 4A and 4B, data storage device 400 may include a substrate 410 that defines a multiple number of cylindrical cavities 411(a)-411(l) and nanostructures 420(a)-420(l) respectively filling cylindrical cavities 411(a)-411(l), where nanostructures 420(a)-420(l) are made of magnetic nanoparticle agglomerates. As used herein, the term "nanostructure" refers to any structure in which at least one dimension is in the nanometer range, where the "nanometer range" refers to a range of sizes from about 0.1 nm to about 1,000 nm, such as from about 0.1 nm to about 500 nm, from about 0.1 nm to about 100 nm, from about 0.1 nm to about 50 nm, or from about 0.1 nm to about 10 nm. Hereinafter, cylindrical cavities 411(a)-411(l) may be collectively referred to as cylindrical cavities 411. Also, hereinafter, nanostructures 420(a)-420(l) may be collectively referred to as nanostructures 420. Each of nanostructures 420 may be vertically aligned with respect to the horizontal plane of substrate 410 and may be magnetized to store data (e.g., 1 bit). For example, each of nanostructures 420 may be magnetized to produce magnetic poles therein, where the magnetic poles may be aligned substantially perpendicular with respect to the horizontal surface of substrate 410. The produced magnetic poles may take one of two possible polarities (e.g., North-South or South-North). The two polarities may respectively represent zero and one of binary data.

In some embodiments, it may be beneficial to increase the storage density (e.g., the number of bits stored per unit area) of data storage device 400 by packing more nanostructures 420 in a unit volume thereby reducing the size of nanostructures 420 therein. Nanostructures 420 with high anisotropy constant K may be used to produce a high storage density data storage device (e.g., data storage device 400 having high storage density).

The anisotropy of a nanostructure is determined by various factors, which include (a) the shape, (b) the chemical composition, and (c) the crystal structure of the nanostructure. Regarding the shape of a nanostructure, a nanostructure with higher aspect ratios may have greater anisotropy constants. As used herein, the term "aspect ratio" of a cavity or a nanostructure refers to a depth or height dimension (length measured along a first axis, e.g., Y axis shown in FIG. 4A), divided by a width dimension (average of the lengths respectively measured along the second and third axes, e.g., X and Z axes shown in FIG. 4A). The first axis refers to an axis normal to the plane or the tangent plane of the substrate surface through which the cavity or the nanostructure is formed, and the second and third axes refer to two mutually orthogonal axes that are in and/or parallel to the above plane or tangent plane. In some instances, the lengths measured along the second and third axes can be substantially the same, and the average of the above lengths can substantially correspond to either of the above lengths. For example, an aspect ratio of a cylindrical cavity refers to the ratio of the depth of the cylindrical cavity and the cross-sectional diameter of the cylindrical cavity. In one embodiment, cavities 410 and nanostructures 420 may be configured to have an aspect ratio greater than 1, such as greater than about 5, greater than about 10, greater than about 20, or greater than about 100. In another embodiment, the aspect ratio may be in the range from about 5 to about 100.

For the chemical composition of nanostructures 420, nanostructures 420 may be configured to include magnetic materials with a high anisotropy constant. In one embodiment, nanostructures 420 may include material(s) such as iron oxides (e.g., $Fe_3O_4$, $\gamma$-$Fe_2O_3$), transition metals (e.g., Fe, Ni, Co), and their alloys (e.g., FePt, CoPt). For example, nanostructures 420 may be made of CoPt alloy or FePt alloy.

Regarding the crystal structure of nanostructures 420, nanostructures 420 may be configured to include magnetic materials with chemically ordered crystal structures. Magnetic alloys with ordered crystal structures may have a higher anisotropy constant compared to magnetic alloys of the same chemical composition with disordered crystal structures. For example, CoPt or FePt with an ordered face-centered-tetragonal (fct) structure may have a larger anisotropy constant compared to CoPt or FePt with a disordered face-centered-cubic (fcc) structure. In one embodiment, nanostructures 420 may include CoPt or FePt with an ordered face-centered-tetragonal (fct) structure.

In one embodiment, data storage device 400 may include a protection layer 430 on the top surface of substrate 410 and nanostructures 420 to protect nanostructures 420 from the ambient atmosphere. Nanostructures 420 are made of magnetic materials, which may be reactive to oxygen in the ambient atmosphere. Thus, in some cases, it may be beneficial to provide protection layer 430 to prevent oxygen in the atmosphere from reaching the surface of nanostructures 420. Examples of materials suitable for use as protection layer 430 include, but are not limited to, silica, carbon, polymer, and graphene. In some embodiments, protection layer 430 may include two or more layers made of different materials. For example, protection layer 430 may include a polymer layer and a graphene layer deposited on the polymer layer.

It should be appreciated that the structural and material configuration of data storage device 400 and nanostructures 420 described in conjunction with FIGS. 4A and 4B are indicative of a few of the various ways in which data storage device 400 may be implemented. For example, while nanostructures 420 shown in FIGS. 4A and 4B are of a cylindrical shape, they may take any arbitrary shape as appropriate in their particular implementations. It should be further appreciated that data storage device 400 and nanostructures 420 may be fabricated in a variety of ways, one of which is explained below.

Figure 5:
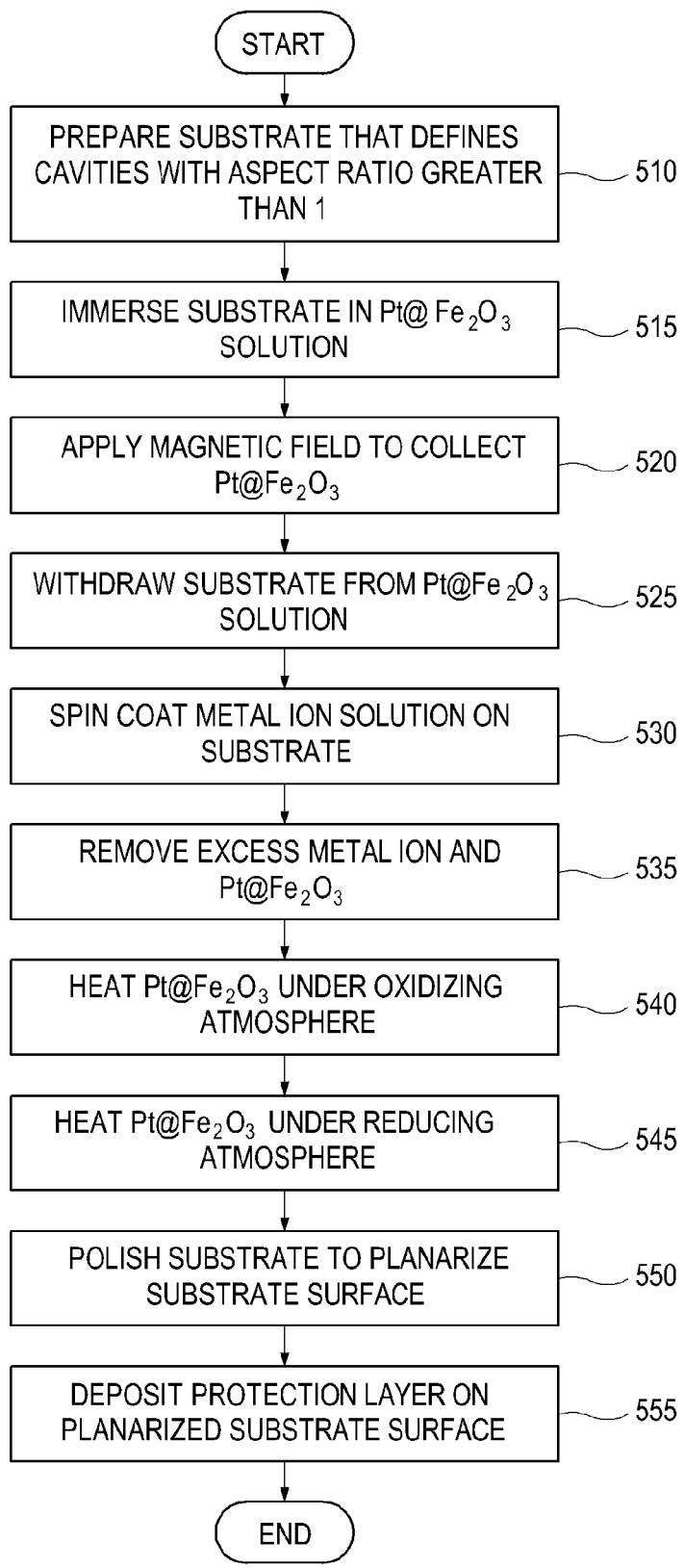
FIG. 5 is an example flow diagram of a method for fabricating a data storage device in accordance with an illustrative embodiment.
Figure 6A:
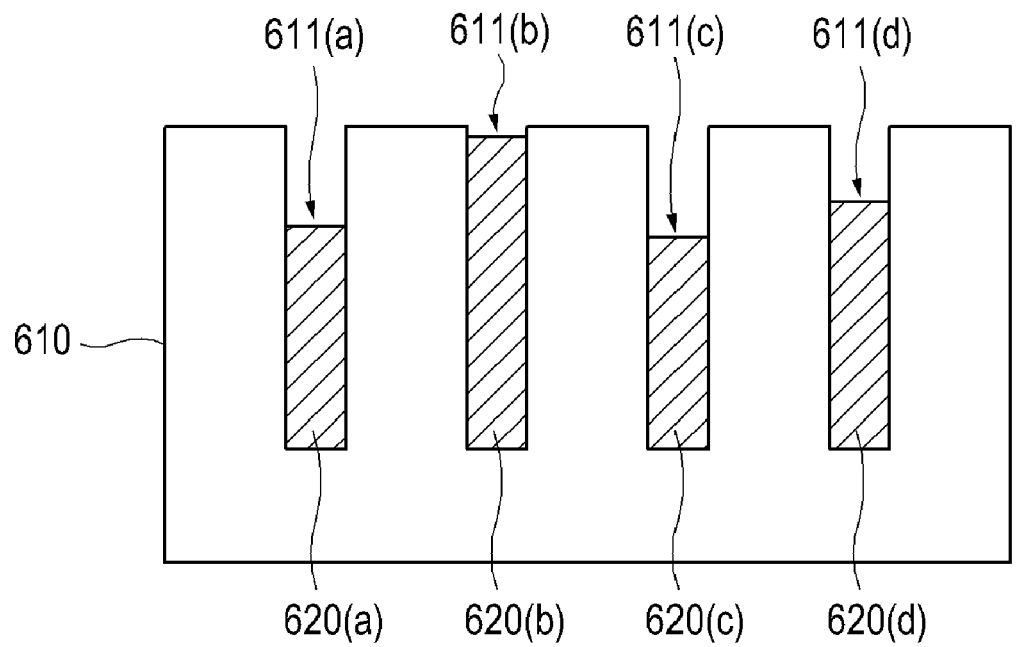
FIGS. 6A-6C are a series of diagrams illustrating some of the method illustrated in FIG. 5.
Figure 6B:
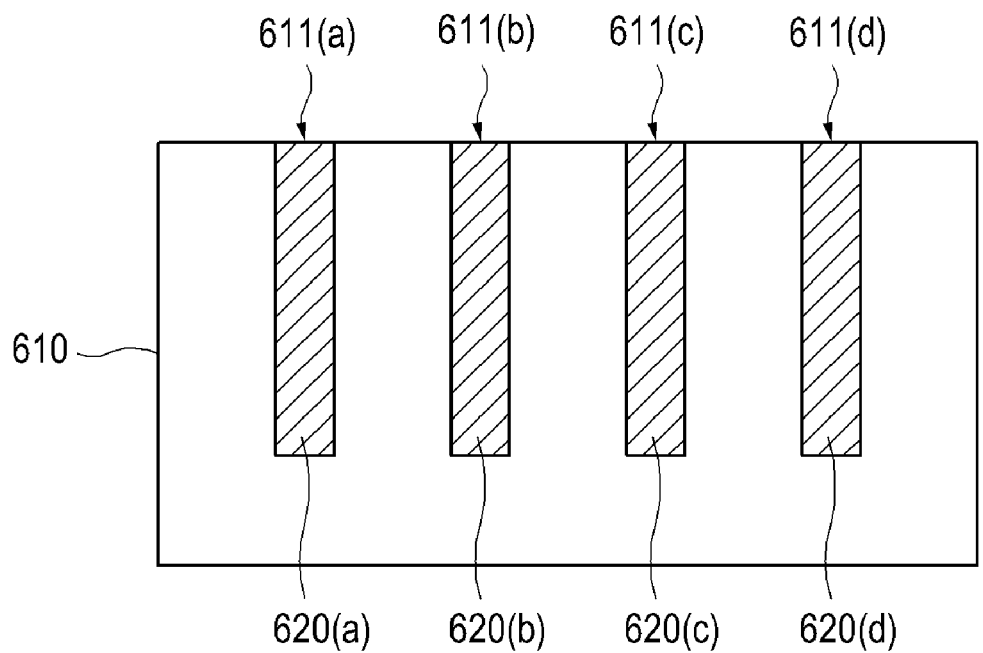
Figure 6C:
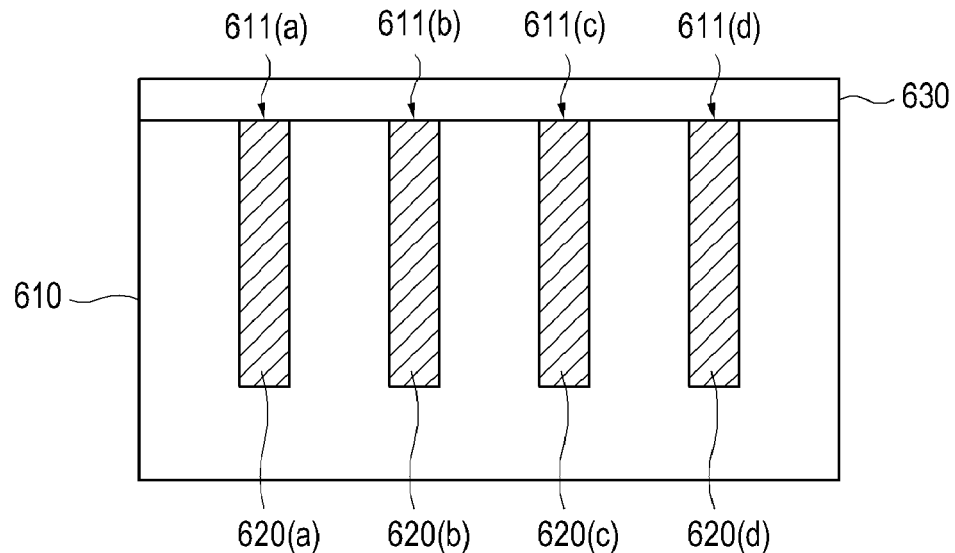

FIG. 5 is a flow diagram of a method for fabricating a data storage device in accordance with an illustrative embodiment. FIGS. 6A-6C are a series of diagrams illustrating some of the method shown in FIG. 5. Referring to FIG. 5, in block

510, a substrate that defines a multiple number of cavities with aspect ratios greater than 1 is prepared. FIG. 6A illustrates a cross-sectional view of a suitable substrate 610 that defines a multiple number of cavities 611. In one embodiment, substrate 610 may be made of materials that are resistant to the heating process (e.g., silicon). Substrate 610 may be prepared by using any one of the substrate preparation processes described with respect to FIG. 1.

Referring again to FIG. 5, in block 515, the substrate is immersed in a magnetic nanoparticle solution. In one embodiment, the magnetic nanoparticle solution may be a solution including Pt@$Fe_2O_3$ nanoparticles (i.e., Pt@$Fe_2O_3$ solution). Further, in some embodiments, Pt@$Fe_2O_3$ nanoparticles may be coated with surfactants. In block 520, a magnetic field is applied to collect Pt@$Fe_2O_3$ nanoparticles into the cavities, and in block 525, the substrate is withdrawn from Pt@$Fe_2O_3$ solution. It will be appreciated that the substrate with the Pt@Fe2O3 nanoparticles collected therein may be obtained by procedures other than those outlined in blocks 515-525. In some embodiments, the substrate with the Pt@Fe2O3 nanoparticles collected therein may be obtained by spin coating a Pt@Fe2O3 solution onto the surface of the substrate prepared in accordance with block 510 while a magnetic field is being applied to collect Pt@Fe2O3 nanoparticles into the cavities of the substrate. In this example, the Pt@Fe2O3 solution spin coated onto the substrate may include substance(s) for increasing its viscosity. Examples of such substance(s) include, but are not limited to, polymers and sugar.

Optionally, after the withdrawn or spin-coated substrate is dried for a prescribed period of time, a solution containing metal ions may be spin coated onto the surface of the substrate through which the cavities are formed (block 530). The metal ion solution may be an aqueous solution (i.e., a solution having water as its solvent). However, other solvents, including organic solvents (e.g., alkane, hexane) may also be used. In one embodiment, the metal ion solution may include substance(s) for increasing its viscosity (e.g., polymers and/or sugar). The spin coating is a process that applies a solution as a uniform thin film onto a substrate. For example, the metal ion solution may be placed onto the substrate, which is then rotated at a prescribed speed (e.g., from about 500 rpm to about 3000 rpm) for a prescribed period of time (e.g., from a few seconds to a few minutes). The spin coating process is well known in the art and can be accomplished without the need of further explanation herein. The spin coated metal ions may enhance the affinity between Pt@$Fe_2O_3$ nanoparticles and may aid in agglomerating the Pt@$Fe_2O_3$ nanoparticles. Other known processes (e.g., a spray coating process) may be employed to coat the metal ions onto the substrate.

In block 535, metal ions and/or Pt@$Fe_2O_3$ nanoparticles that are on the top surface of the substrate and other excessively coated metal ions and/or excessively collected Pt@$Fe_2O_3$ nanoparticles are removed. For example, the excessively coated metal ions and Pt@$Fe_2O_3$ may be removed using a polishing device. In block 540, the collected Pt@$Fe_2O_3$ nanoparticles are heated in an oxidizing atmosphere, so as to remove the surfactants from the collected Pt@$Fe_2O_3$ nanoparticles as well as to agglomerate the collected Pt@$Fe_2O_3$ nanoparticles into a cohesive mass. The above heating process may be performed at a prescribed temperature (e.g., in the range from about 400° C. to about 500° C.) for about a few seconds (e.g., 10 s) to about an hour. In block 545, the agglomerated Pt@$Fe_2O_3$ nanoparticles are further heated in a reducing atmosphere, which may be created by introducing a flow of Ar(95%)/$H_2$(5%) (approximate mixture) gas or $N_2$(90%)/$H_2$(10%) (approximate mixture), at a prescribed temperature (e.g., about 550° C. or about 650° C.) for a prescribed period of time (e.g., about 9 hours). The above heating process may remove oxygen from the $Fe_2O_3$ shell and convert the Pt@$Fe_2O_3$ nanoparticles into FePt nanoparticles, while further agglomerating the above collected nanoparticles. If the Pt@$Fe_2O_3$ nanoparticles are heated with a prescribed temperature range (e.g., about 550° C. or about 650° C.), the resulting FePt nanoparticles may be of an ordered fct structure. FIG. 6A illustrates a cross-sectional view of the resulting substrate 610 with FePt nanoparticle agglomerates or FePt nanostructures 620(a)-620(d) formed in cavities 611(a)-611(d) of substrate 610. Hereinafter, nanostructures formed in substrate 610 (including nanostructures 620(a)-620(d)) may be generically referred to as nanostructures 620.

Referring again to FIG. 5, in block 550, the substrate and/or FePt nanostructures formed therein are polished to planarize the top surface of the substrate. FIG. 6B illustrates a cross-sectional view of substrate 610 with a planarized top surface. The planarized top surface of substrate 610 may include portions corresponding to the top surface of FePt nanostructures 620 formed in substrate 610. A chemical mechanical polishing (CMP) process or other appropriate polishing processes may be employed. Referring again to FIG. 5, in block 555, a protection layer is deposited on the top surface of the substrate, and the method then completes. FIG. 6C illustrates a cross-sectional view of substrate 610 with a protection layer 630 deposited thereon. It should be appreciated that the method described in conjunction with FIGS. 5 and 6A-6C is indicative of a few of the various ways in which the data storage device of FIGS. 4A and 4B may be implemented, and should not be construed as limiting the way the data storage device is fabricated.

Figure 7A:
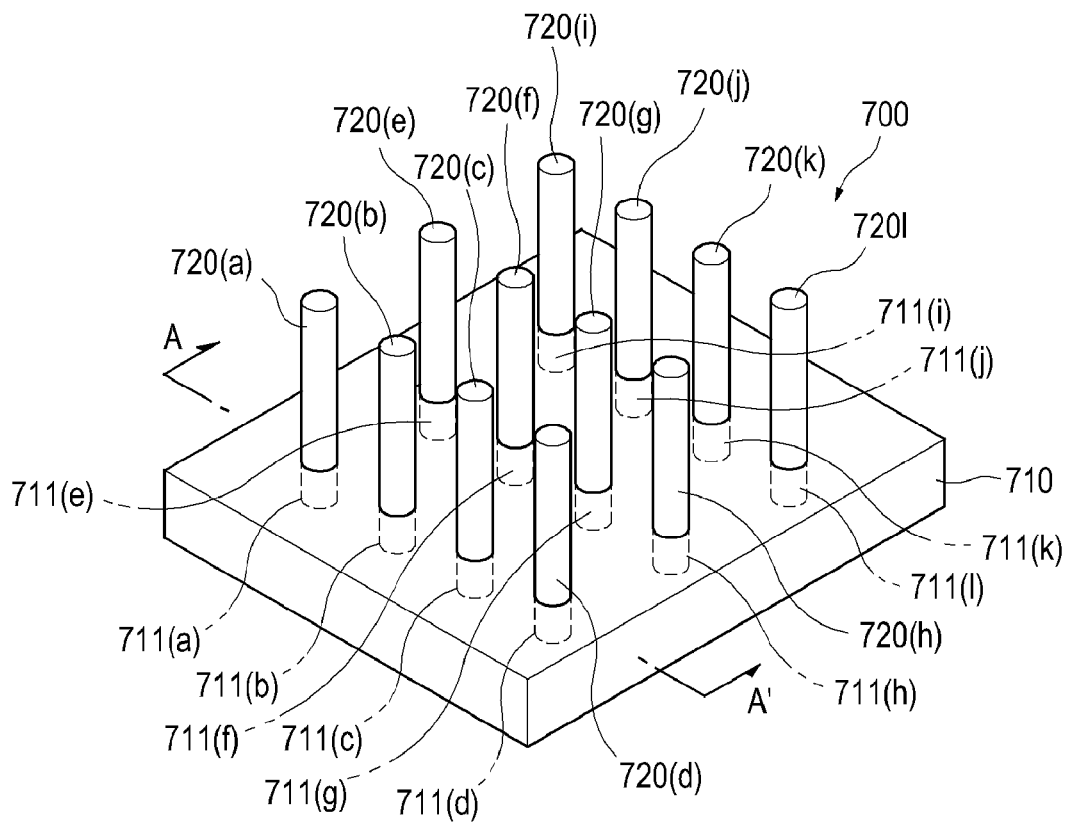
FIG. 7A is a perspective view of an illustrative embodiment of a nanorod device.
Figure 7B:
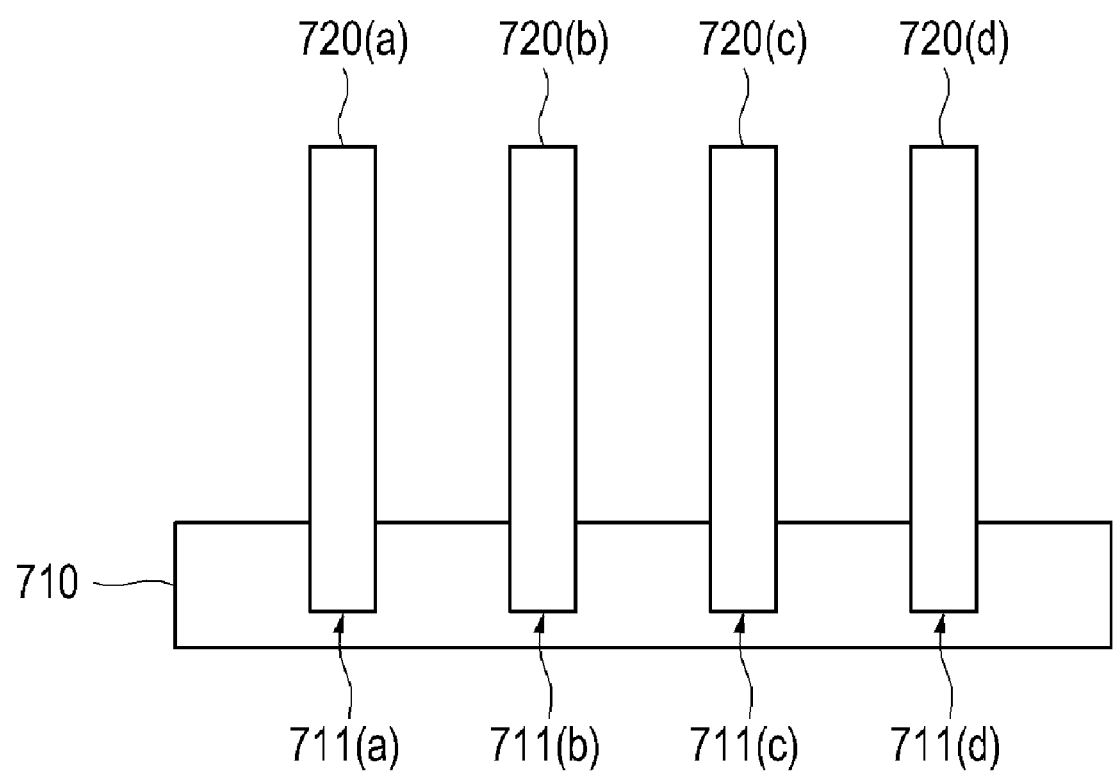
FIG. 7B is a cross-sectional view of an illustrative embodiment of the nanorod device of FIG. 7A taken along line A-A'.

The structures and methods described herein can be employed in fabricating other nanostructures and/or devices. In one embodiment, the magnetic nanoparticles collected and agglomerated in the cavities of a substrate may be used as catalysts for producing nanostructures made of different materials on the substrate. FIGS. 7A and 7B illustrate a nanorod device 700 in accordance with an illustrative embodiment. FIG. 7A is a perspective view of nanorod device 700. FIG. 7B is a cross-sectional view of nanorod device 700 of FIG. 7A taken along line A-A'. Referring to FIGS. 7A and 7B, nanorod device 700 may include a substrate 710 that defines a multiple number of cylindrical cavities 711(a)-711(l) and a multiple number of nanorods 720(a)-720(l) respectively located in and protruding substantially upward from cavities 711(a)-711(l). Hereinafter, cylindrical cavities 711(a)-711(l) may be collectively referred to as cylindrical cavities 711. Also, hereinafter, nanorods 720(a)-720(l) may be collectively referred to as nanorods 720. In one embodiment, nanorods 720 may be made of a semiconductor material (e.g., silicon). Nanorod device 700 has diverse applications, ranging from display technologies (the reflectivity of nanorods 720 can be changed by changing their orientation with an applied electric field) to micro-electromechanical systems (MEMS).

Figure 8:
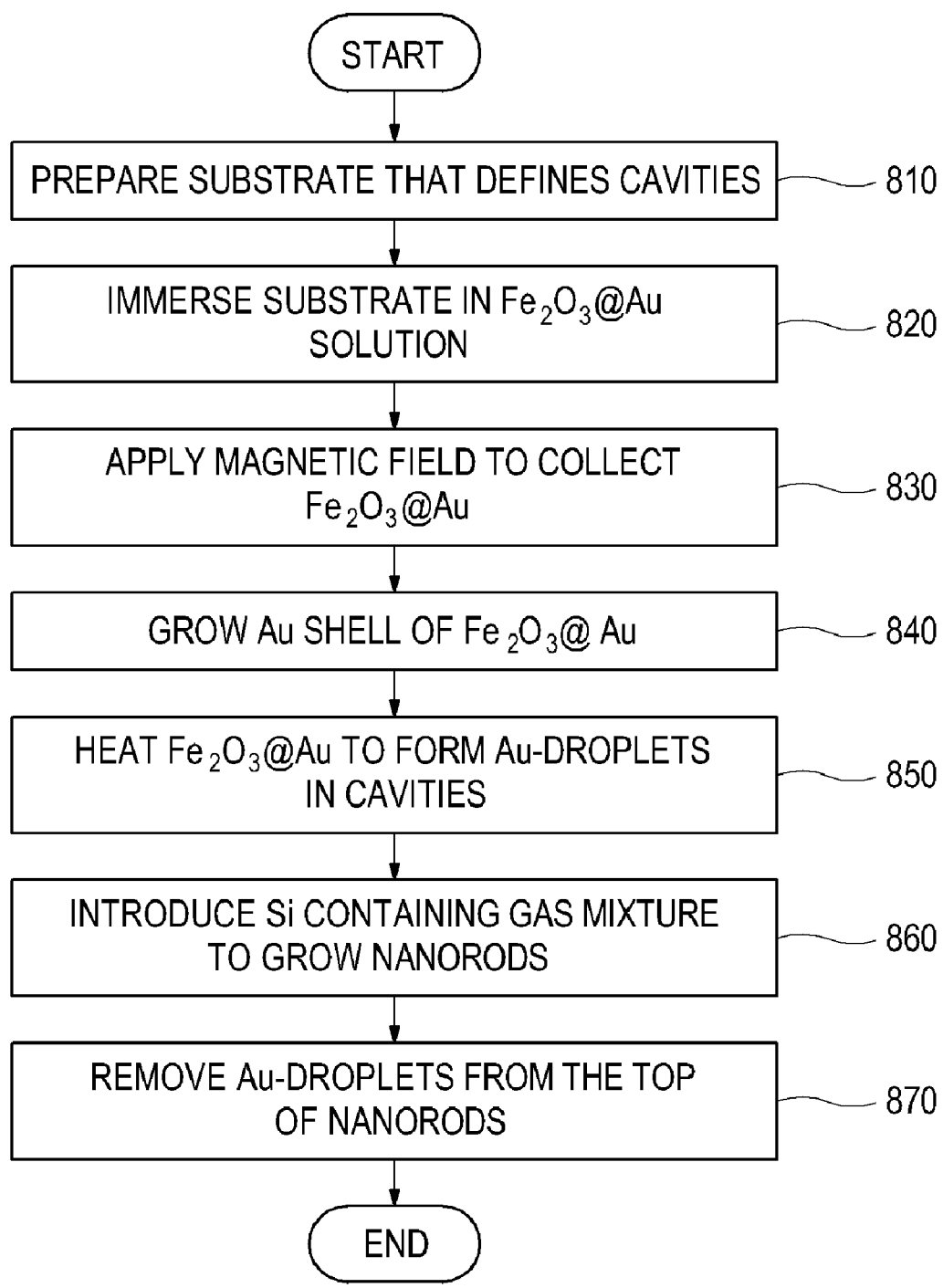
FIG. 8 is an example flow diagram illustrating a method for fabricating a nanorod device in accordance with an illustrative embodiment.
Figure 9A:
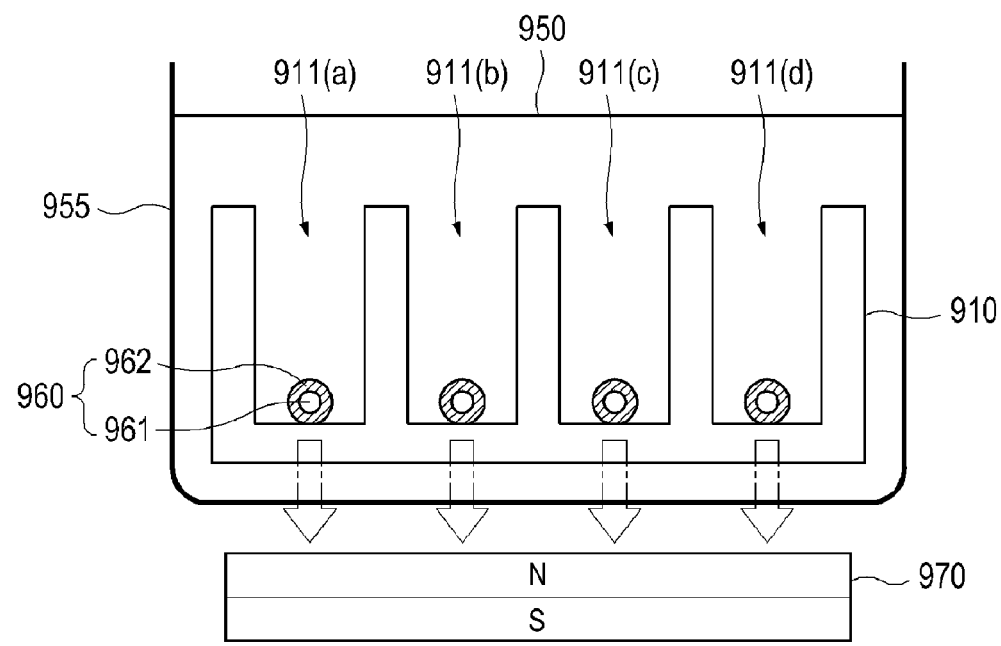
FIGS. 9A-9E are a series of diagrams illustrating the method illustrated in FIG. 8.
Figure 9B:
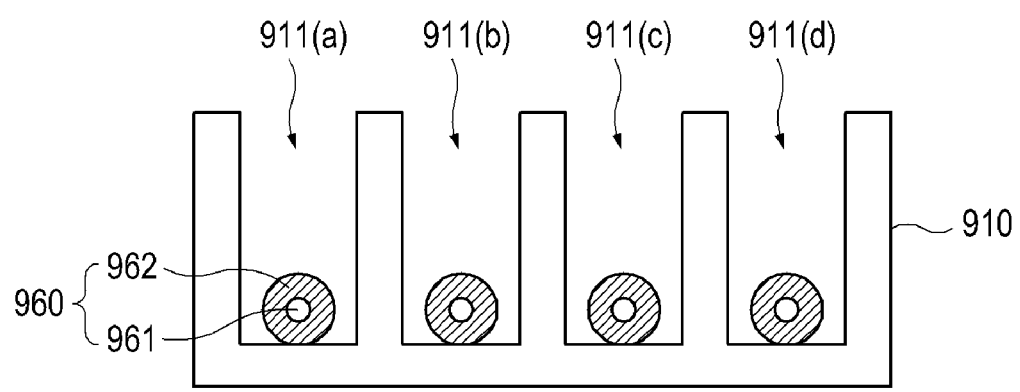
Figure 9C:
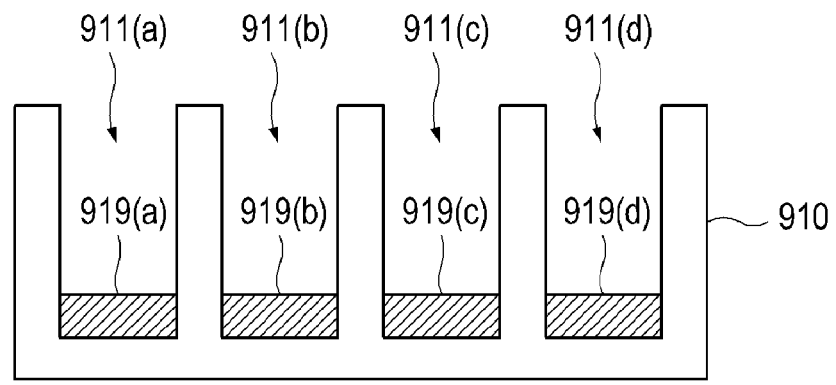
Figure 9D:
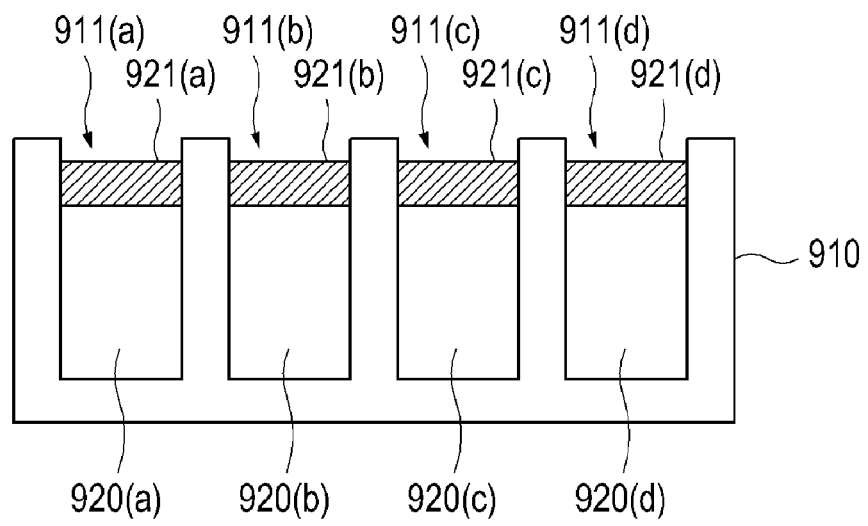
Figure 9E:
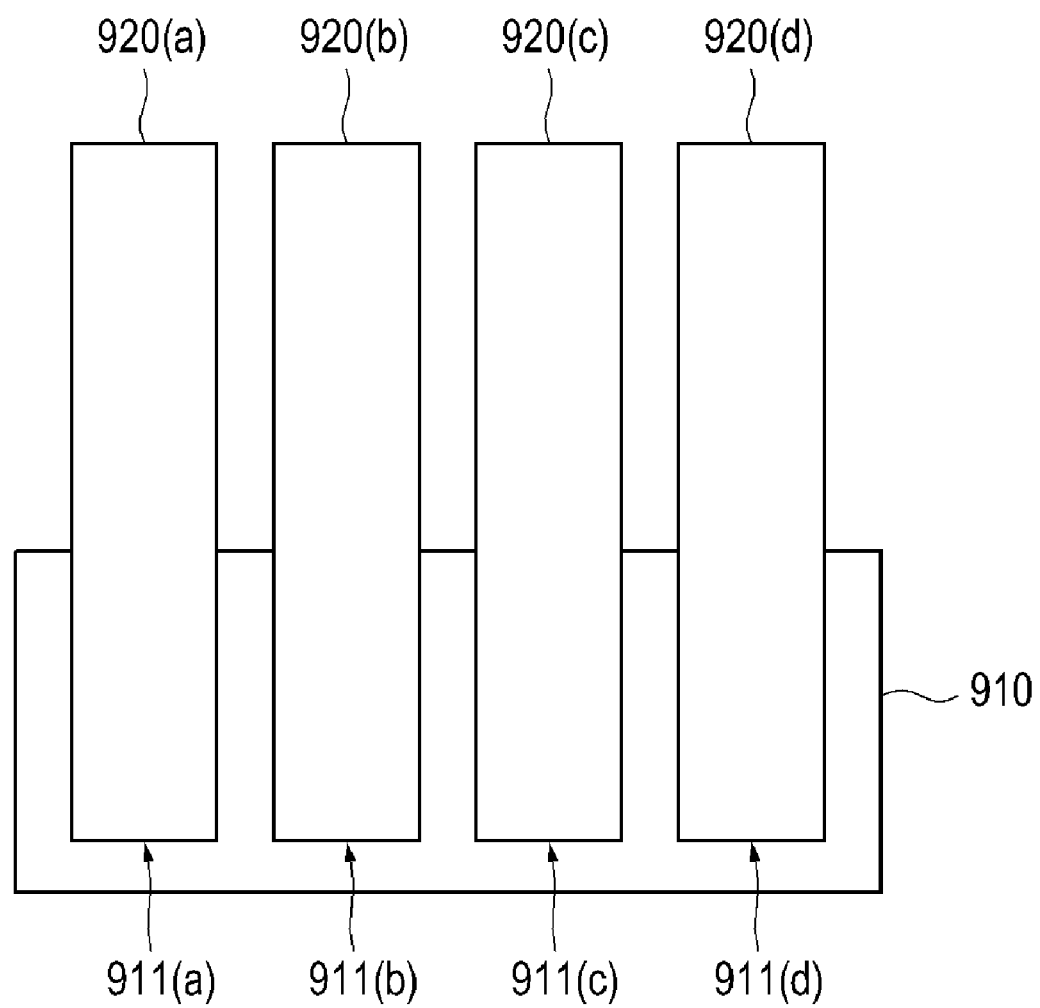

Nanorods 720 may be grown by using various catalytic techniques, which use a catalyst(s) of one material in forming a nanorod of a different material. Examples of such techniques include, but are not limited to, vapor-solid (VS) techniques and vapor-liquid-solid (VLS) techniques. FIG. 8 is a flow diagram illustrating an example method for fabricating a nanorod device in accordance with an illustrative embodiment. FIGS. 9A-9E are a series of diagrams illustrating the example method shown in FIG. 8 and the structures fabricated by the example method. Referring to FIG. 8, in block 810, a substrate that defines a multiple number of cylindrical cavities is prepared. FIG. 9A illustrates a cross-sectional view of a suitable substrate 910 that defines a multiple number of cylindrical cavities (including cavities 911(a)-911(d)). Hereinafter, the cylindrical cavities formed in substrate 910 (including cylindrical cavities 911(a)-911(d) shown in FIG. 9A) may be collectively referred to as cylindrical cavities 911. Referring again to FIG. 8, in block 820, the substrate is immersed into a $Fe_2O_3$@Au solution, and in block 830, a magnetic field is applied, for example, by a magnetic-field generating unit, to collect $Fe_2O_3$@Au magnetic nanoparticles (including a $Fe_2O_3$ core and a Au shell) into the cylindrical cavities. FIG. 9A illustrates a magnetic-field generating unit 970 applying a magnetic field to magnetic nanoparticle solution 950, so as to collect $Fe_2O_3$@Au magnetic nanoparticles 960 (including a $Fe_2O_3$ core 961 and a Au shell 962) into cylindrical cavities 911. For simplicity, only one $Fe_2O_3$@Au magnetic nanoparticle 960 is shown in each of cylindrical cavities 911(a)-911(d) even though many may exist. Referring again to FIG. 8, in block 840, the Au shells of the $Fe_2O_3$@Au magnetic nanoparticles are grown by using one of the appropriate shell growth techniques. For example, the substrate may be soaked with a $HAuCl_4$ solution or a gold colloid solution so that Au particles in the solution may attach to the Au shells of the $Fe_2O_3$@Au magnetic nanoparticles. In this regard, FIG. 9B illustrates $Fe_2O_3$@Au magnetic nanoparticles 960 with grown Au shells 962. Referring again to FIG. 8, in block 850, the shell-grown $Fe_2O_3$@Au magnetic nanoparticles are heated under a prescribed atmosphere (e.g., an inert or a reducing atmosphere) to agglomerate them into liquid-phase Au-droplets in the cavities of the substrate. FIG. 9C illustrates liquid-phase Au-droplets 919(a)-919(d) respectively formed in cavities 911(a)-911(d). Hereinafter, the Au-droplets in cavities 911 (including Au-droplets 919(a)-919(d)) may be collectively referred to as Au-droplets 919. Au-droplets 919 in cavities 911 may be used as catalysts for growing nanorods made of semiconductor materials such as silicon (Si). Referring again to FIG. 8, in block 860, a Si containing gas mixture (e.g., a gas mixture including $SiH_4$ and $H_2$) is introduced to grow nanorods in the cavities under the Au-droplets. FIG. 9D illustrates nanorods 920(a)-920(d) respectively grown in cavities 911(a)-911(d) under Au-droplets 919(a)-919(d). Hereinafter, the nanorods formed in cavities (including nanorods 920(a)-920(d)) may be collectively referred to as nanorods 920. For example, as Si is supplied from the gas mixture, Au-droplets 919 may become supersaturated with Si and the excess Si may precipitate out of Au-droplets 919 to form Si nanorods 920 under Au-droplets 919. Referring again to FIG. 8, in block 870, after the growth is complete, the Au-droplets on the nanorods may be removed, and the method then completes. FIG. 9E illustrates the resulting nanorods 920(a)-920(d) formed in cavities 911(a)-911(d) of substrate 910. It should be appreciated that substances other than Au, such as Fe, Co, Mo, Ga, Al, Ti, and Ni, may be used as catalysts without departing from the scope of this disclosure.

Figure 10:
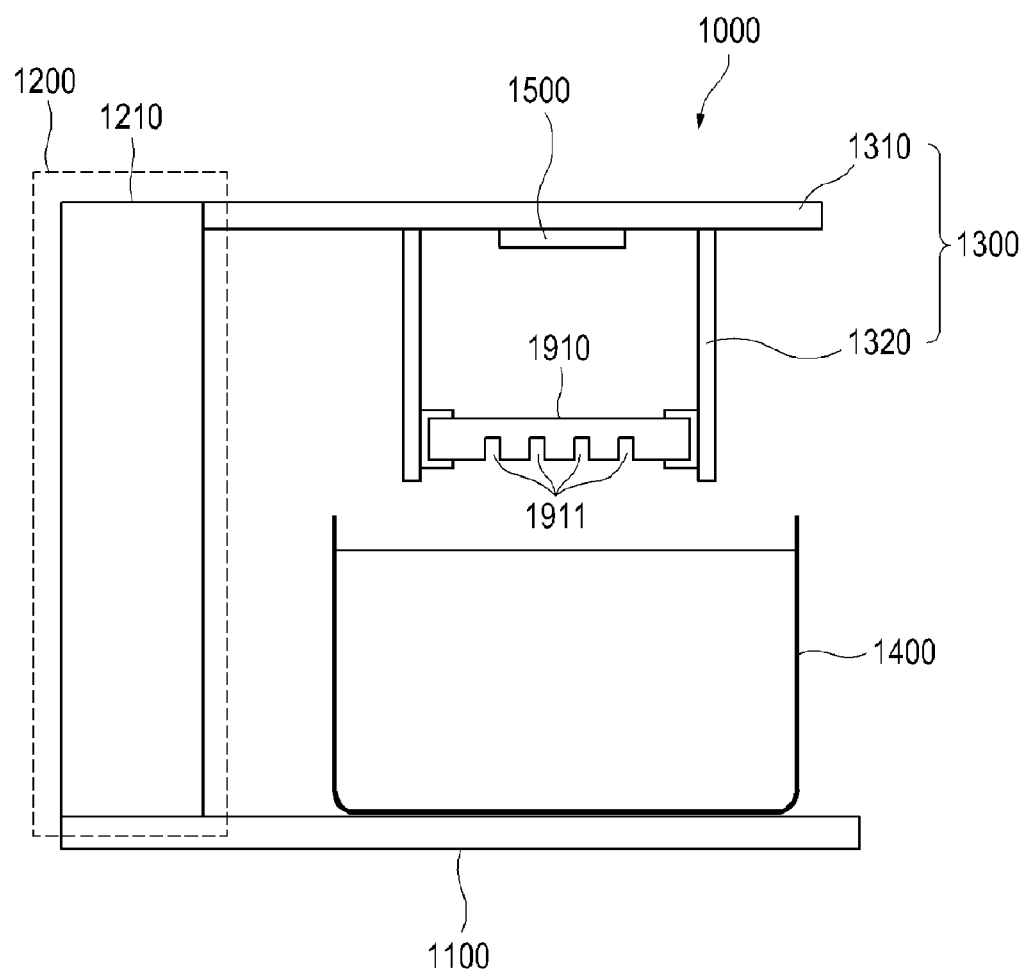
FIG. 10 is a schematic view of illustrative embodiment of an apparatus for fabricating magnetic nanoparticle aggregates.

FIG. 10 is a schematic view of an illustrative embodiment of an apparatus for fabricating magnetic nanoparticle aggregates. Referring to FIG. 10, an apparatus 1000 may include a base 1100 and a manipulating unit 1200 mounted on base 1100. Manipulating unit 1200 may include a guide member 1210 and a vertically arranged track (not shown), which may be formed as rails fitted into guide member 1210. A holding unit 1300 may include a horizontal member 1310 mounted to the track in guide member 1210 and a securing member 1320 connected to the bottom surface of horizontal member 1310. Securing member 1320 may be configured to hold the two outer ends of a substrate 1910 with cavities 1911 and rotate substrate 1910 along the axis between the two outer ends. A container 1400 configured to retain a magnetic nanoparticle solution may be positioned on base 1100 and below securing member 1320. Horizontal member 1310 may be configured to traverse vertically along the track in guide member 1210 in a manner such that substrate 1910 secured by securing member 1320 may be immersed or withdrew from the magnetic nanoparticle solution in container 1400. A magnetic-field generating unit 1500 may be connected to the bottom surface of horizontal member 1310 and in proximity to substrate 1910, and may be configured to apply a magnetic field when substrate 1910 is immersed into the magnetic nanoparticle solution, so as to collect at least some of the magnetic nanoparticles into cavities 1911.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g. "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under the control of at least one apparatus for fabricating magnetic particles, the method comprising:
    preparing a substrate that defines at least one cavity through a portion thereof;
    soaking the substrate with a solution, the solution including a plurality of magnetic nanoparticles; and
    applying a magnetic field so as to collect at least a portion of the magnetic nanoparticles into the at least one cavity.

2. The method of claim 1, wherein the magnetic nanoparticles including at least one member selected from the group consisting of single substance magnetic nanoparticles, sub-cluster segregated magnetic nanoparticles, core-shell segregated magnetic nanoparticles.

3. The method of claim 1, wherein the magnetic nanoparticles include at least one chemical element selected from the group consisting of Fe, Co, and Ni.

4. The method of claim 3, wherein the magnetic nanoparticles include FePt nanoparticles.

5. The method of claim 1, further comprising:
    spin-coating a solution including metal ions onto the substrate.

6. The method of claim 1, further comprising:
    heating the collected nanoparticles so as to agglomerate at least a portion of the collected magnetic nanoparticles.

7. The method of claim 6, wherein at least a portion of the collected nanoparticles are at least partially coated with at least one surfactant, and wherein the heating comprises:
    heating the collected nanoparticles with at least one oxidizing gas to remove the at least one surfactant from at least a portion of the collected nanoparticles.

8. The method of claim 6, wherein at least a portion of the collected nanoparticles are at least partially coated with at least one surfactant, and wherein the heating comprises:
    heating the collected nanoparticles with at least one of a reducing gas and an inert gas at a prescribed temperature to convert a chemical composition of the at least one surfactant.

9. The method of claim 6, wherein at least a portion of the collected nanoparticles include oxygen, and wherein the heating includes:
    heating the collected nanoparticles with at least one reducing gas to remove the oxygen from the collected magnetic nanoparticles.

10. The method of claim 6, wherein the heating comprises:
    heating the collected nanoparticles with at least one inert gas.

11. The method of claim 6, wherein the heating comprises:
    heating the collected nanoparticles at a prescribed temperature so as to convert a crystal structure of at least a portion of the collected nanoparticles.

12. The method of claim 6, further comprising:
    planarizing at least a portion of a surface of the substrate; and
    depositing a protection layer on the planarized surface of the substrate.

13. The method of claim 12, wherein the protection layer is made of a material selected from the group consisting of silica, carbon, polymer, and graphene.

14. The method of claim 1, wherein the collected magnetic nanoparticles are core-shell segregated nanoparticles including a core made of a first substance and a shell made of a second substance, respectively, and wherein the method further comprises:
    introducing the second substance to grow the shells of the collected magnetic nanoparticles.

15. The method of claim 14, further comprising:
    heating the grown shells to form catalyst clusters including the second substance; and
    growing nanostructures from the catalyst clusters.

16. The method of claim 1, wherein a strength of the applied magnetic field is in the range from about 0.1 Tesla to about 3 Tesla.

17. The method of claim 1, wherein a magnetic nanoparticle concentration of the magnetic nanoparticle solution is in the range from about 0.01 sat to about 1 sat.

18. The method of claim 17, wherein a magnetic nanoparticle concentration of the magnetic nanoparticle solution is about 0.1 sat.

19. The method of claim 1, wherein the prepared substrate has an aspect ratio greater than 1.

20. The method of claim 1, wherein the prepared substrate has an aspect ratio greater than 5.

21. The method of claim 1, wherein the magnetic nanoparticles including mixed magnetic nanoparticles.

22. A method comprising:
providing a heat resistant substrate including at least one cavity region that defines at least one cavity therein;
immersing the heat resistant substrate in a plurality of magnetic nanoparticles;
applying a magnetic field about the heat resistant substrate effective to collect at least a portion of the plurality of magnetic nanoparticles in the at least one cavity; and
heating the collected magnetic nanoparticles to agglomerate the collected magnetic nanoparticles within the at least one cavity.

23. The method of claim 22, wherein heating the collected magnetic nanoparticles to agglomerate the collected magnetic nanoparticles within the at least one cavity comprises heating the collected magnetic nanoparticles in an oxidizing atmosphere and a reducing atmosphere.

24. The method of claim 22, wherein the plurality of magnetic nanoparticles are selected from the group consisting of single substance magnetic nanoparticles, subcluster segregated magnetic nanoparticles, core-shell segregated magnetic nanoparticles, mixed magnetic nanoparticles, and combinations thereof.

25. The method of claim 22, further comprising heating the collected magnetic nanoparticles to alter a crystal structure thereof.

26. A method of growing nanostructures, comprising:
immersing a substrate, having a plurality of cavity regions that define a plurality of isolation cavities therein, in a solution of plurality of magnetic nanoparticles;
by application of a magnetic field, directing at least a portion of the plurality of magnetic nanoparticles into the plurality of isolation cavities to collect the at least a portion of the plurality of magnetic nanoparticles therein, wherein the collected magnetic nanoparticles are core-shell nanoparticles including a core comprising a first substance and a shell comprising a second substance;
introducing an additional amount of the second substance to grow the shells of the collected magnetic nanoparticles;
heating the collected magnetic nanoparticles having the grown shells to form catalyst clusters; and
growing the nanostructures which are catalyzed by the catalyst clusters.

27. The method of claim 26 wherein growing the nanostructures which are catalyzed by the catalyst clusters comprises growing semiconductor nanorods catalyzed by the catalyst clusters.

* * * * *

UNITED STATES PATENT AND TRADEMARK OFFICE
CERTIFICATE OF CORRECTION

PATENT NO.        : 8,247,025 B2                              Page 1 of 1
APPLICATION NO.   : 12/468329
DATED             : August 21, 2012
INVENTOR(S)       : Lee It is certified that error appears in the above-identified patent and that said Letters Patent is hereby corrected as shown below:

In Column 9, Line 18, delete "Pt@Fe2O3" and insert -- $Pt@Fe_2O_3$ --, therefor.

In Column 9, Line 21, delete "Pt@Fe2O3" and insert -- $Pt@Fe_2O_3$ --, therefor.

In Column 9, Line 22, delete "Pt@Fe2O3" and insert -- $Pt@Fe_2O_3$ --, therefor.

In Column 9, Line 24, delete "Pt@Fe2O3" and insert -- $Pt@Fe_2O_3$ --, therefor.

In Column 9, Line 26, delete "Pt@Fe2O3" and insert -- $Pt@Fe_2O_3$ --, therefor.

In Column 12, Line 59, delete "(e.g." and insert -- (e.g., --, therefor.

In Column 12, Line 66, delete "(e.g." and insert -- (e.g., --, therefor.

In Column 13, Line 4, delete "(e.g." and insert -- (e.g., --, therefor.

In Column 16, Line 24, in Claim 27, delete "26" and insert -- 26, --, therefor.

Signed and Sealed this
Twentieth Day of November, 2012

David J. Kappos
*Director of the United States Patent and Trademark Office*